Sept. 21, 1926.  
L. A. CORCORAN  
1,600,453  
WHEELED VEHICLE  
Filed Dec. 7, 1925   2 Sheets-Sheet 1
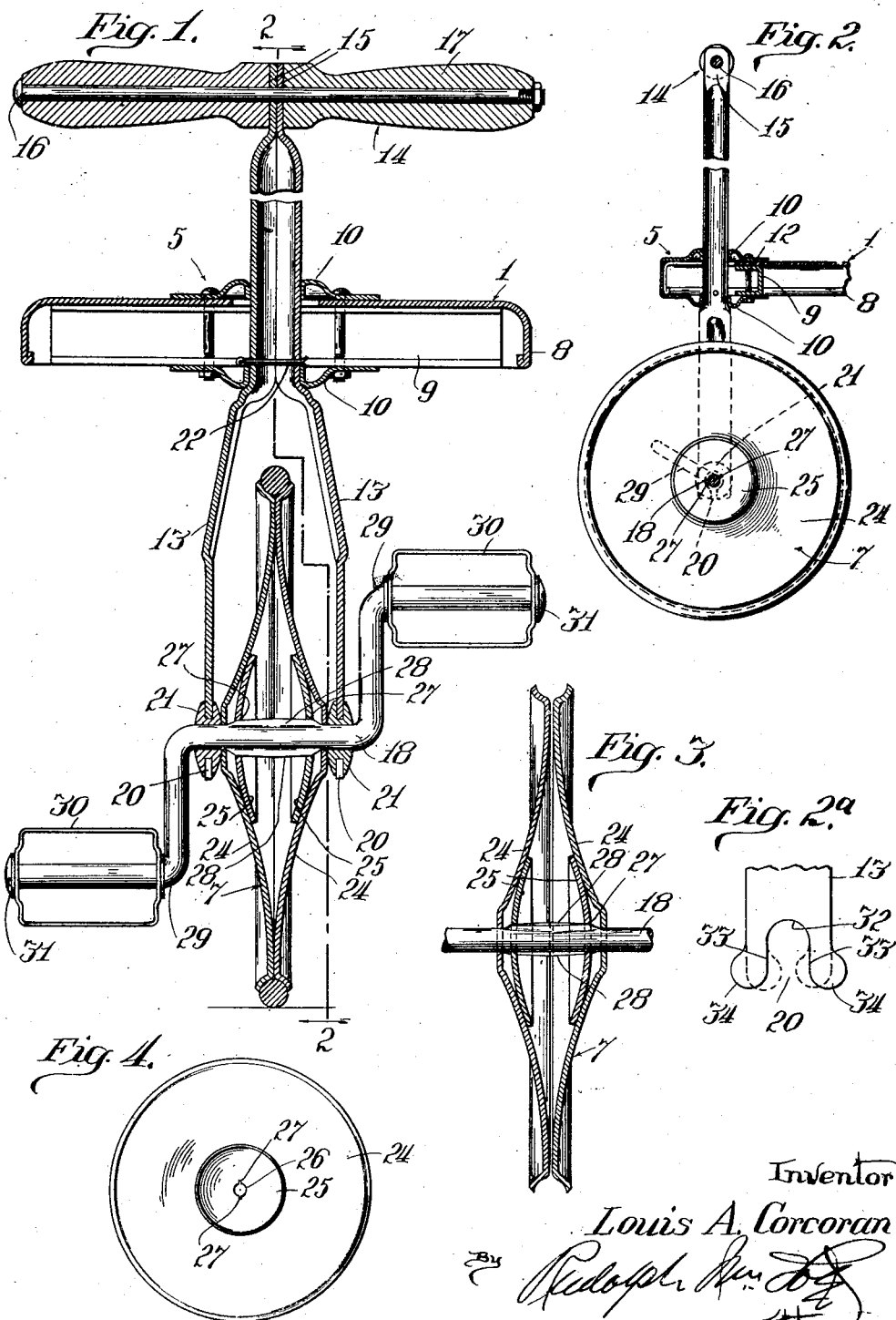
Inventor  
Louis A. Corcoran  
By Rudolph ...  
Attorney

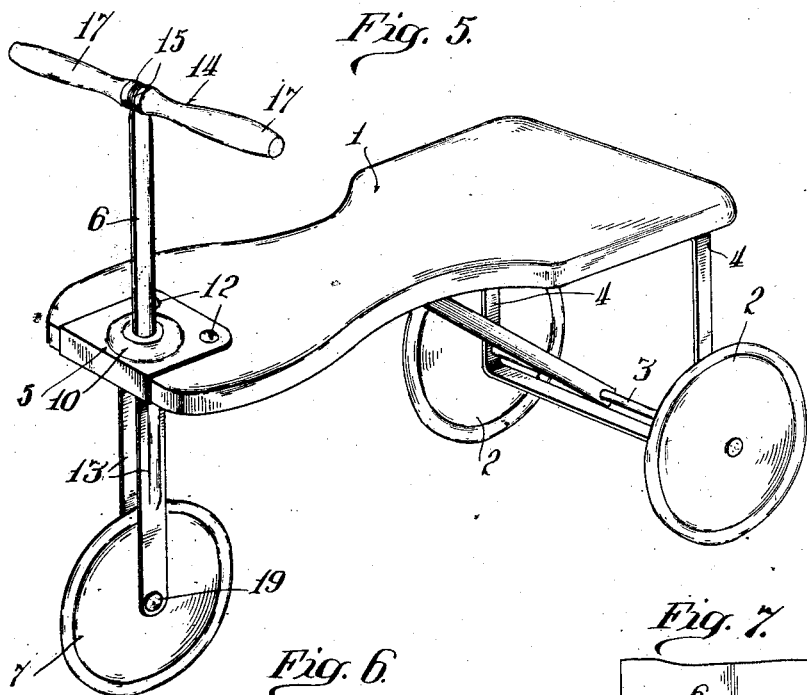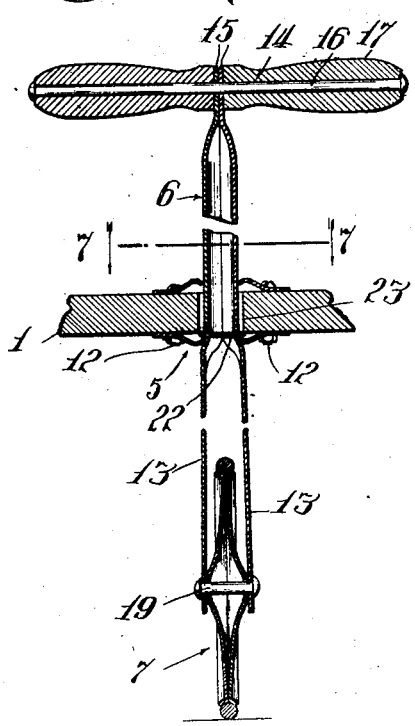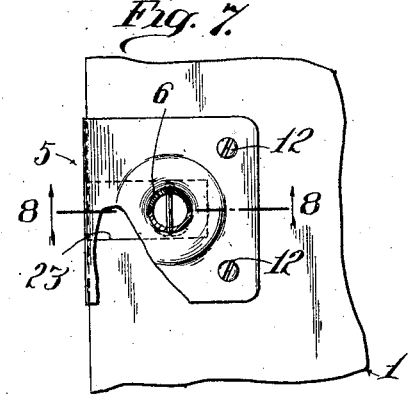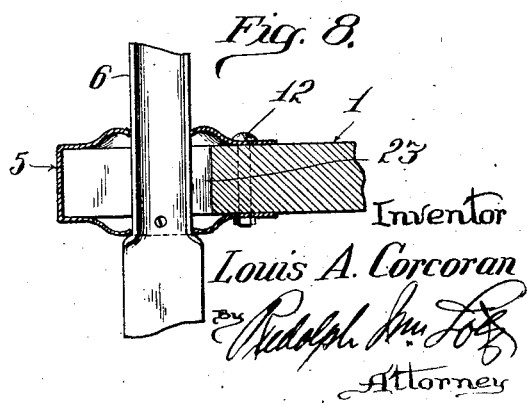

Patented Sept. 21, 1926.

1,600,453

UNITED STATES PATENT OFFICE.

LOUIS A. CORCORAN, OF INDIANAPOLIS, INDIANA.

WHEELED VEHICLE.

Application filed December 7, 1925. Serial No. 73,619.

This invention relates to improvements in wheeled vehicles of the type ridden by children and, more particularly to the steering post and front wheel mounting of such vehicles.

The invention has for one of its objects to provide a vehicle of the class specified which may be sold in such partially dissembled form as will permit of compact packaging and, furthermore, of easy assembly by the purchaser and which, when assembled, is very strong and durable and presents no sharp projections apt to come in contact with and tear clothing or injure the limbs of a child rider.

The invention has, in harmony with the foregoing general object, for its more particular object the construction of a unitary steering-post, front wheel fork, steering-post bearing and front wheel equipped with pedals, which is very cheap, durable and efficient and incapable of dissembly except by practically destroying the whole structure.

In the accompanying drawings illustrating preferred embodiments of the invention:—

Fig. 1 is a vertical transverse section of a vehicle constructed in accordance with my invention and equipped with a front pedal-wheel.

Fig. 2 is a fragmentary vertical longitudinal section of the same on the line 2—2 of Fig. 1.

Fig. 2ᵃ is a fragmentary detail view in side elevation of one arm of the fork of the steering post before assembly with the steering wheel.

Fig. 3 is a detail section of front wheel.

Fig. 4 is a side elevation of one of the disks of the front wheel.

Fig. 5 is a perspective view of the complete vehicle, the front wheel being devoid of the pedal shaft.

Fig. 6 is a vertical transverse section of the steering-post end of the vehicle and of the steering-post and front wheel shown in Fig. 5.

Fig. 7 is a plan section on the line 7—7 of Fig. 6.

Fig. 8 is a fragmentary detail section on the line 8—8 of Fig. 7.

The vehicle herein illustrated is of a very well-known type which comprises a seat 1, a pair of rear supporting wheels 2, a rear axle 3, an axle-yoke 4, a steering-post bearing 5, steering-post 6 and front wheel 7.

The seat 1 may be of wood as shown in Figs. 6 and 8 or may be of sheet metal as shown in Figs. 1 and 2. When made of sheet metal the seat body is bordered by a peripheral flange 8 having an overturned free edge, the total depth of said seat from the top surface to the lower edge of its flange 8 is substantially equal to the thickness of the wood structure of Figs. 6 and 8 so that either the wood or metal seat may be interchangeably associated with the steering-post bearing and rear axle-yoke. To this end the metal seat is provided at points where bolts for securing the steering-post bearing and the rear axle-yoke thereto, are passed through the same, with strips 9 of channel bar of conventional commercial type of proper width, said strips being welded to the seat and, in the case of the steering-post bearing, co-operating with the peripheral flange 8 to firmly hold said bearing in place.

The said bearing 5 consists of a U-shaped member having parallel flanges each provided with a substantially centrally disposed opening bordered by a circular rib on embossing 10 for reinforcing the flange, the said openings of said flanges being axially aligned. Perforations for the passage of bolts 12 are also provided in the free corner portions of said flanges. The latter are spaced from each other a distance substantially equal to the thickness or depth of the seat 1 so that a portion of the latter may be received therebetween.

The steering-post 6, which includes the fork 13 and handle bar 14, consists of two equal parts formed of sheet metal, each thereof presenting a semi-cylindrical portion terminating at one end in a flat projection 15 and at its other end in one of the arms of the fork 13. The two said component members are disposed in opposed relation thereby providing a post having a cylindrical main portion, a pair of opposed contacting projections 15 at its upper end and the fork 13 at its lower end. The handle bar 14 comprises a metal rod passed through aligned perforations in the projections 15 and carrying the wood sleeves 17, the outer ends of the metal bar being upset like rivets in such manner and to such an extent as to bear forcibly upon the other ends of the sleeves 17 and thus clamp the same against the projections 15.

The shaft of the front wheel 7, which may, as shown in Fig. 1, be a pedal-crank shaft 18 or, as shown in Figs. 5 and 6, be substantially only a long rivet 19, is passed through openings in the free or lower ends of the arms of the fork 13, said openings, in Figs. 5 and 6, being perforations, and, in Figs. 1 and 2, being slots 20 receiving the annularly grooved bearing members 21 rotatably mounted on the shaft 18.

In manufacture, the front wheel is mounted in the fork and thereupon the upper end portion of the steering-post, still devoid of the handle-bar, is passed through the bearing 5 and then the handle-bar is mounted on the upper end. A cotter-pin 22 is then passed through perforations in the cylindrical portion of the post just above the fork and above the lower flange of the bearing 5 so as to confine the latter against appreciable movement longitudinally of the post.

The seat 1 is provided in its forward end with a longitudinal slot 23 of a width (particularly in the case of the wood seat) greater than the diameter of the cylindrical portion of the steering-post in order to provide room for the projecting ends of the cotter-pin 22. The steering-post as a unit which includes the bearing 5, handle-bar 16 and front wheel 7 is thus very easily associated with the seat 1 by inserting the front end of the latter between the flanges of the bearing 5 until its extreme front end abuts the middle portion of said bearing. When the bolts 12 have been passed through the perforations in the flanges and through corresponding perforations in the seat 1, the association of the seat and steering-post is complete and the slot in the seat is invisible.

In the structure of Figs. 1 to 4, the front wheel is somewhat differently constructed than in the case of Figs. 5 and 6 to the end that the pedal shaft 18 may be non-rotatably associated with said wheel. As shown in Figs. 3 and 4, the wheel consists of two equal opposed dished disks 24 to the inner faces of which the circular reinforcing disks 25 are welded, said disks 25 being disposed centrally of the disks 24. Thereupon the central openings 26 are punched through the disks 24 and 25, said openings including relatively shallow radial extension slots 27. A straight shaft 18 of requisite length to provide the crank extension portions shown in Fig. 1, is formed with opposed integral radial flanges 28 midway between its ends, said flanges constituting and being hereinafter referred to as keys. These keys are tapered toward their ends and the end portions thereof are engaged in the slots 27 to thereby non-rotatably associate the shaft 18 with the disks of the wheel. The said disks are now held in a slightly spaced relation to each other, or, in other words, out of surface contact at their peripheries and must be forced into contact and so held while being coupled, preferably by spot welding.

The bearing members 21 are now mounted on the shaft 18 on opposite sides of the wheel and the shaft 18 then bent to form the pedal-cranks 29 on which pedals 30 are rotatably mounted and held by upsetting the extreme ends of the cranks as shown at 31.

The lower ends of the arms of the fork 13 are provided with what may aptly be termed key-hole slots which include the arcuate portions 32 and the initially tangential wall portions 33. The projections 34, of which said wall portions 33 constitute inner edges, are now inserted into the grooves of the bearing members 21 and are then bent to contract the mouth portions of the slots and firmly engage the bottoms of the grooves of the bearing members 21 to hold the latter against rotation and to prevent the same from becoming disengaged from the fork 13.

From the foregoing it will be obvious that the assembled steering-post is not only very strong and durable but that it cannot be dissembled without practically destroying it and, further, that it presents no sharp projections to injure a child rider. It will be further obvious that the whole structure can very cheaply be produced.

The embodiment of the invention in the specific type of vehicle illustrated is merely exemplary, it being obvious that the seat member is merely a frame element having a bifurcated end portion for engagement with the bearing, it being quite immaterial whether said frame member constitutes or is used as a seat.

I claim as my invention:—

1. In a vehicle, a steering-post comprising two equal opposed members each semi-cylindrical between their ends and terminating at both ends in flat arms or projections, two of the latter constituting a fork, a wheel rotatably mounted in said fork, the flat arms or projections at the other ends of said members disposed in parallel opposed relation and contact and provided with axially aligned perforations, a handle-bar secured to the last-named projections, a bearing on the cylindrical portion of said post, and a key member for holding said bearing against longitudinal movement on said post.

2. In a vehicle, a steering-post comprising two equal opposed members each semi-cylindrical between their ends and terminating at both ends in flat arms or projections, two of the latter constituting a fork, and bent to provide shoulders at their junction with the semi-cylindrical portions of said members, a wheel rotatably mounted in said fork, the flat arms or projections at the other ends of said members disposed in parallel opposed relation and contact and provided with axially aligned perforations, a handle-bar secured to the last-named projections, a bearing on the cylindrical portion of said post, and a key member cooperating with said shoulders for holding said bearing against longitudinal movement on said post.

3. In a vehicle, a steering-post comprising two equal opposed members each semi-cylindrical between their ends and terminating at both ends in flat arms or projections, two of the latter constituting a fork, and bent to provide shoulders at their junction with the semi-cylindrical portions of said members, a wheel rotatably mounted in said fork, the flat arms or projections at the other ends of said members disposed in parallel opposed relation and contact and provided with axially aligned perforations, a handle-bar secured to the projections, said handle bar comprising a pair of tubular members, a rivet passing through the same and said perforations for securing said handle bar members to said post, and a bearing rotatably mounted on the cylindrical portion of said post and normally engaging said shoulders.

4. In a vehicle, a steering-post comprising two equal opposed members each semi-cylindrical between their ends and terminating in flat arms or projections, two of the latter constituting a fork, and bent to provide shoulders at their junction with the semi-cylindrical portions of said members, a wheel rotatably mounted in said fork, a handle-bar secured to the projections at the other end of said post, a U-shaped bearing member having its flanges rotatably mounted on said post, and a key element passing through said post between said flanges of said bearing and coacting with said shoulders to hold said bearing against longitudinal movement relatively to said post.

5. In a vehicle, a steering-post comprising two equal opposed members each semi-cylindrical between their ends and terminating in flat arms or projections, two of the latter constituting a fork, and bent to provide shoulders at their junction with the semi-cylindrical portions of said members, a wheel rotatably mounted in said fork, a handle-bar secured to the projections at the other end of said post, a U-shaped bearing member having its flanges rotatably mounted on said post, and a key element passing through said post between said flanges of said bearing and coacting with said shoulders to hold said bearing against longitudinal movement relatively to said post, a frame element engaged between the flanges of said bearing and having a slot in which said post and key element are rotatable.

6. A vehicle including a frame member provided with a bifurcated end portion, a steering-post adapted to be received in the slot of said end portion for rotation, and a steering-post bearing including two parallel plates connected with and spaced from each other and receiving and secured to the bifurcated end portion of said frame member, said plates provided with axially aligned openings for the passage of the steering post and with perforations for the passage of bolts for securing said bearing to the frame member at points removed from the slot in the latter.

7. A vehicle including a frame member provided with a bifurcated end portion, a steering-post adapted to be received in the slot of said end portion for rotation, and a steering-post bearing consisting of a U-shaped sheet metal member having parallel spaced flanges provided with openings through which said steering-post passes, said end portion of said frame member being disposed between and secured to said flanges and the said slot closed by the middle portion of said bearing.

8. In a vehicle, a pedal wheel comprising two opposed equal members each provided with a central opening including radial extension slots, a pedal-crank shaft provided midway between its ends with key formations for engaging in said extension slots for preventing rotation of said shaft relatively to the wheel, and for spacing the parts thereof from each other, and a steering-post having a fork rotatably engaged with said shaft on either side of said wheel.

9. In a vehicle, a pedal wheel comprising two opposed equal members each provided with a central opening including radial extension slots, a pedal-crank shaft provided midway between its ends with key formations for engaging in said extension slots for preventing rotation of said shaft relatively to the wheel, and for spacing the parts thereof from each other, bearing members mounted on said shaft on either side of said wheel, and a steering-post including a fork engaged with said bearing members.

10. In a vehicle, a pedal wheel comprising two opposed equal members each provided with a central opening including radial extension slots, a pedal-crank shaft provided midway between its ends with key formations for engaging in said extension slots for preventing rotation of said shaft relatively to the wheel, and for spacing the parts thereof from each other, bearing members rotatably mounted on said shaft at either side of said wheel and each provided with an annular groove, a steering-post including a fork between the arms of which said wheel is received, there being contractible slots in the ends of said arms for receiving the grooved portions of said bearing members and retaining the latter upon contraction of said slots.

11. In a vehicle, a pedal wheel comprising two opposed equal members each provided with a central opening including radial extension slots, a pedal-crank shaft provided midway between its ends with key formations for engaging in said extension slots for preventing rotation of said shaft relatively to the wheel, and for spacing the parts thereof from each other, bearing members rotatably mounted on said shaft at either side of said wheel and each provided with an annular groove, a steering-post including a fork between the arms of which said wheel is received, the ends of said arms being bifurcated to thereby provide opposed arms or projections for engaging in the annular grooves of said bearing members, said arms being bent toward each other to contract the slots bordered thereby for retaining said bearing members in said slots.

12. In a vehicle, a wheel, a pedal-crank shaft non-rotatably engaged with said wheel, bearing members each provided with an annular groove, rotatably disposed on said shaft on opposite sides of said wheel, a steering-post fork having bifurcated ends providing arms engaged in said grooves of said bearing members and bent to contract the mouths of the slots which they border for retaining said bearing members in said slots.

13. In a vehicle, a wheel comprising a pair of dished equal opposed sheet metal disks, reinforcing plates welded to the central portions of said disks, there being central openings in said several plates and disks including radial extension slots, a shaft passing through said central openings and provided between said disks with key formations engaging at opposite end portions in said radial extension slots for non-rotatably engaging said shaft with said wheel.

14. In a vehicle, a wheel comprising a pair of dished equal opposed sheet metal disks, reinforcing plates welded to the central portions of said disks, there being central openings in said several plates and disks including radial extension slots, a shaft passing through said central openings and provided between said disks with key formations engaging at opposite end portions in said radial extension slots for non-rotatably engaging said shaft with said wheel, bearing members, each provided with an annular groove, rotatably mounted on said shaft at opposite sides of said wheel, frame members having bifurcated frame members providing projections engaging in said annular grooves and bent to contract the mouths of the slots bordered thereby for retaining said bearing members in said slots.

15. In a vehicle, a wheel comprising a pair of dished equal opposed sheet metal disks, reinforcing plates welded to the central portions of said disks, there being central openings in said several plates and disks including radial extension slots, a shaft passing through said central openings and provided between said disks with key formations engaging at opposite end portions in said radial extension slots for non-rotatably engaging said shaft with said wheel, said key formations including means whereby the said disks are maintained normally spaced apart while permitting peripheral portions thereof to be sprung into contact with each other, said contacting peripheral portions being secured together to thereby exert a yielding pressure on said key-formations of said shaft.

LOUIS A. CORCORAN.